US012322848B2

(12) United States Patent
Koh et al.

(10) Patent No.: US 12,322,848 B2
(45) Date of Patent: Jun. 3, 2025

(54) BROADBAND JUNCTION FERRITE CIRCULATOR

(71) Applicant: Millimeter Wave Systems, LLC, Amherst, MA (US)

(72) Inventors: Christopher T. Koh, Amherst, MA (US); James R. Strickland, Shutesbury, MA (US); William R. Shedd, Palmer, MA (US); Kenneth R. Wood, Hadley, MA (US); Martin Skowyra, Palmer, MA (US)

(73) Assignee: Millimeter Wave Systems, LLC, Amhurst, MA (US)

( * ) Notice: Subject to any disclaimer, the term of this patent is extended or adjusted under 35 U.S.C. 154(b) by 120 days.

(21) Appl. No.: 18/212,338

(22) Filed: Jun. 21, 2023

(65) Prior Publication Data

US 2023/0420820 A1 Dec. 28, 2023

Related U.S. Application Data

(60) Provisional application No. 63/355,108, filed on Jun. 24, 2022.

(51) Int. Cl.
*H01P 1/39* (2006.01)

(52) U.S. Cl.
CPC .................................... *H01P 1/39* (2013.01)

(58) Field of Classification Search
CPC .... H01P 1/39; H01P 1/38; H01P 1/383; H01P 1/36; H01P 1/32
USPC ................................................. 333/1.1, 24.2
See application file for complete search history.

(56) References Cited

U.S. PATENT DOCUMENTS 4,254,384 A * 3/1981 Piotrowski ................ H01P 1/11 333/1.1

* cited by examiner

*Primary Examiner* — Andrea Lindgren Baltzell
*Assistant Examiner* — Abigail Amir Yaldo
(74) *Attorney, Agent, or Firm* — David J. Thibodeau, Jr.; VLP Law Group LLP

(57) ABSTRACT

A rectangular waveguide circulator consists of multiple sections that meet at a common junction where a tapered ferrite portion is disposed. A ferrite portion is disposed within a hollow space adjacent the common junction. The ferrite portion has a shape that includes an upper portion, a middle portion, and a lower portion, such that a cross sectional area of the upper portion is greater than a cross-sectional area of the middle portion, and such that a cross sectional area of the lower portion is greater than the cross-sectional area of the middle portion.

9 Claims, 4 Drawing Sheets

BROADBAND JUNCTION FERRITE CIRCULATOR

CROSS REFERENCE TO RELATED APPLICATION(S)

This application claims priority to U.S. Provisional Application Ser. No. 63/355,108 filed Jun. 24, 2022 entitled "BROADBAND JUNCTION FERRITE CIRCULATOR", the entire contents of which are hereby incorporated by reference.

TECHNICAL FIELD

This application relates to increasing the bandwidth of operation of rectangular waveguide junction circulators.

BACKGROUND

Rectangular waveguide junction ferrite devices have been in use for decades in communications systems and radars. These devices exploit the non-reciprocal rotation of propagating electromagnetic waves normal to the bias field of a ferrite that is magnetized near saturation. Typical applications include three-port circulator devices for duplexing of the transmitter and receiver system elements in radars and communication systems.

Another common application is a two-port isolator device implemented as a three-port circulator wherein one port is terminated in a load. This structure allows signals to pass in one direction and isolates the signal flow in the opposite direction because of a reverse signal circulating to the load.

The rectangular waveguides in a circulator are commonly implemented as three "arms" arranged in a 'Y' shape forming a junction where the arms come together. Each rectangular waveguide is typically disposed with approximately a 2:1 ratio of broad wall to narrow wall dimensions and readily propagates TE10 modes. Common ferrite geometries include a triangular post, a cylindrical post, or disks. The ferrite is commonly located in the center of the Y-junction. A magnetic bias, typically provided by external permanent magnets, is used to magnetically saturate the ferrite. The direction of the bias field determines the direction of circulation. See for example Jensen et al. U.S. Pat. No. 3,466,571, and Brown U.S. Pat. No. 5,724,010.

H. How, in U.S. Pat. No. 7,242,264 B2 describes a device to be used with a ferrite stripline circulator/isolator. It discusses a tapered structure to generate and shape a bias magnetic field to show a gradually decreasing axial component over the active region of the ferrite stripline circulator/isolator circuit.

Kroening, in U.S. Pat. No. 8,902,012 B2, describes a waveguide that is tapered or narrowed in the region of the waveguide around the ferrite element. The taper is indicated along the direction of signal propagation.

Kimata, in U.S. Pat. No. 10,431,864 B2 Kimata describes a ferrite formed into a truncated cone shape that tapers from the upper surface to the lower surface. This ferrite is not disposed in a waveguide but rather is instead placed on a circuit board as a Surface Mount Technology (SMT).

SUMMARY

In preferred embodiments, a circulator device is implemented using rectangular waveguide sections that meet at a junction where a tapered ferrite portion is disposed. More particularly, a circulator device may include multiple sections of rectangular conductively bounded hollow waveguide, connected to meet in a common junction. A ferrite portion is disposed within a hollow space adjacent the common junction. The ferrite portion has a shape that includes an upper portion, a middle portion, and a lower portion, such that a cross sectional area of the upper portion is greater than a cross-sectional area of the middle portion, and such that a cross sectional area of the lower portion is greater than the cross-sectional area of the middle portion.

In some aspects, the ferrite portion further includes three ordered cross-sections A, B, and C such that (a) cross-section A is located closer to a top wall of the common junction than a plane at cross-section B or C; (b) cross-section C is located closer to another wall of the common junction than a plane at either A or B; and/or (c) an area of cross-section B is less than either the areas of cross-section A or cross-section C.

In some aspects, the shape of the ferrite portion is such that an operation band falls within a desired range with a broadened frequency response.

In some aspects, the upper portion has a different cross-sectional shape than a cross sectional shape of the lower portion.

In some aspects, the shape of the ferrite portion has a continuous taper from the upper portion through the middle portion to the lower portion.

In some aspects, the ferrite portion further includes a plurality of stacked ferrite material sections, each material section being generally planar.

In some aspects, at least one of the upper portion, middle portion or lower portion has a circular cross-sectional shape.

In some aspects, at least one of the upper portion, middle portion or lower portion has a triangular cross-sectional shape.

In some aspects, the ferrite portion is interposed with at least one dielectric layer.

In some aspects, the ferrite portion is interposed with at least one electrically conductive layer.

DETAILED DESCRIPTION OF PREFERRED EMBODIMENTS

Figure 1:
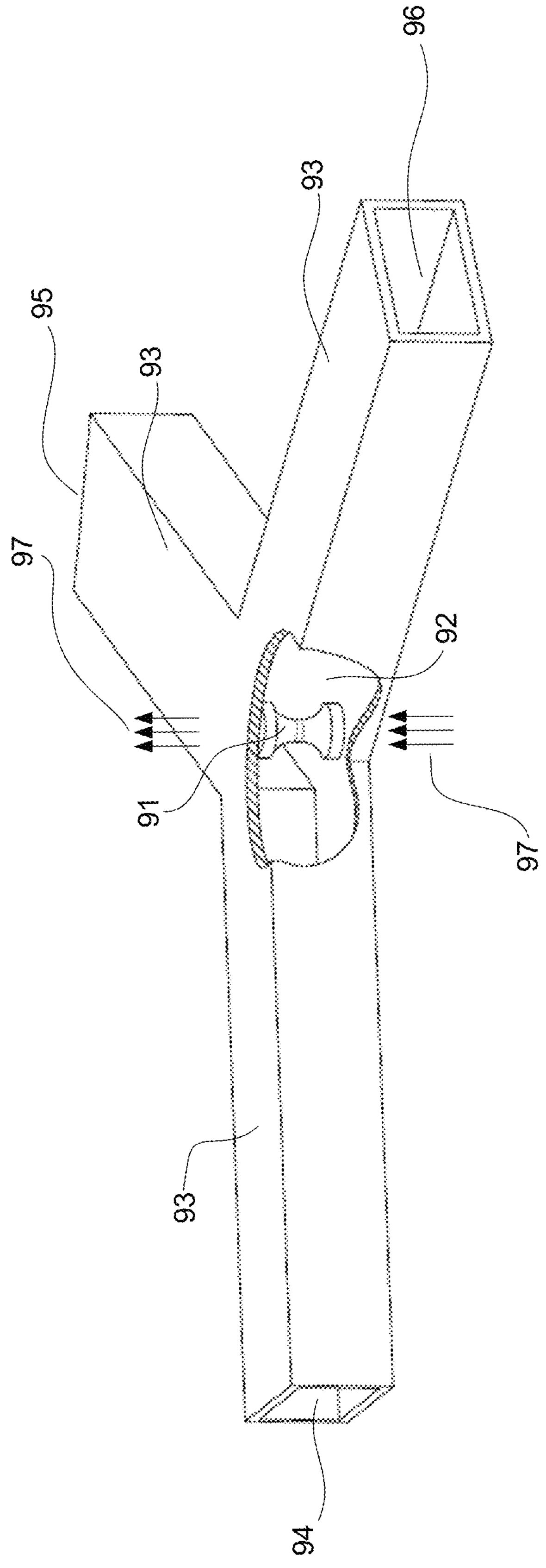
FIG. 1 illustrates an example circulator device implemented in rectangular waveguide sections arranged in a Y-junction.

Referring to FIG. 1, a rectangular waveguide circulator device has three or more ports 94, 95, and 96 connected through respective waveguides 93 to a common junction 92. The waveguides may be rectangular, conductively bounded hollow waveguides. A ferrite portion, typically a post, 91 of center-narrowed cross-section is disposed in a hollow space formed at the waveguide junction 92. An external magnetic field 97 is applied to the device. Typically, the strength of the magnetic field may be 1000 to 5000 Gauss. The magnetic field is strong enough to bias the ferrite material near saturation. The direction of the magnetic field determines the rotation of the circulator. Methods for providing a magnetic bias field include permanent magnets and electromagnets deposed around the junction (not shown here).

Use of a tapered ferrite has been found to broaden the frequency response of the circulator. A key feature of this device is the taper of the ferrite post 91 toward the center of the waveguide along the direction of the bias field and normal to the direction of signal propagation. This taper of the post 91 thus acts to broaden the frequency response of the circulator which is desirable for many applications.

Figure 2:
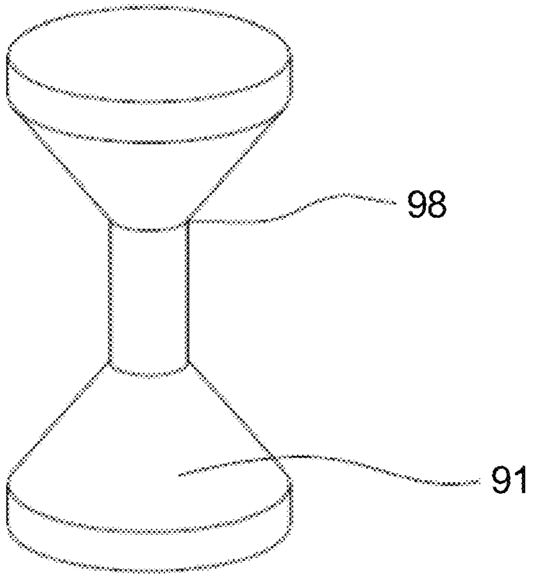
FIG. 2 shows an example ferrite post in more detail.

The profile of the taper of the ferrite can be along a continuous curve (as depicted in FIG. 1) or can have one or more step discontinuities 98 as shown in FIG. 2. The ferrite post 91 can be of any shape provided the cross-section area is smaller in the middle of the ferrite than at the ends.

Referring to FIGS. 3A through 3D, ferrite posts 91 can be described as having three ordered horizontal cross-sections 105, 106 and 107 where the upper cross-section at 105 is closer to a top wall of the waveguide 101 than the cross-sections at 106 and 107. The lower cross-section at 107 is closer to the bottom wall 102 than cross-sections at 105 and 106. The middle cross-sectional area at point 106 is less than cross-sectional area at 105 and less than the cross-sectional area at 107.

Figures 3A, 3B, 3C, 3D:
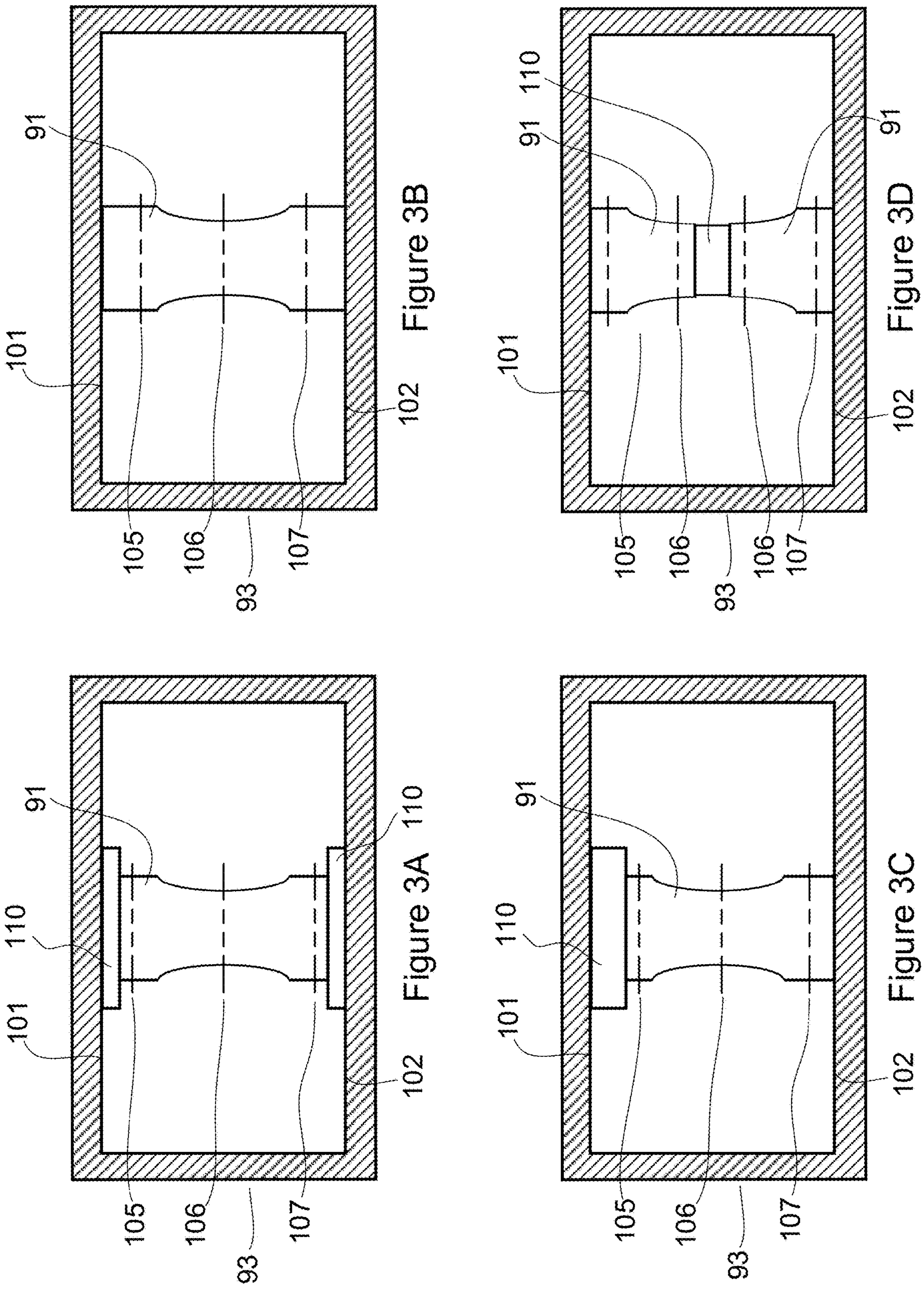
FIGS. 3A, 3B, 3C and 3D each depict still other configurations of ferrite posts.

The ferrite post 91 may be interposed or stacked with non-ferrite layers at any number of distances along its length. These layers can be generally planar dielectric layers or generally planar electrically conductive layers. These features are used, for example, to change the waveguide impedance at the junction, or to provide thermal heat transfer, or to alter the boundary conditions at the ferrite interfaces. Examples are shown in FIGS. 3A, 3C, and 3D where these non-ferrite layers or plates 110 are disposed along the length of the ferrite post 91 at various locations including one or both ends of the ferrite post 91 and/or in the middle. The general case of a dielectric is intended to include air and vacuum.

Figure 4:
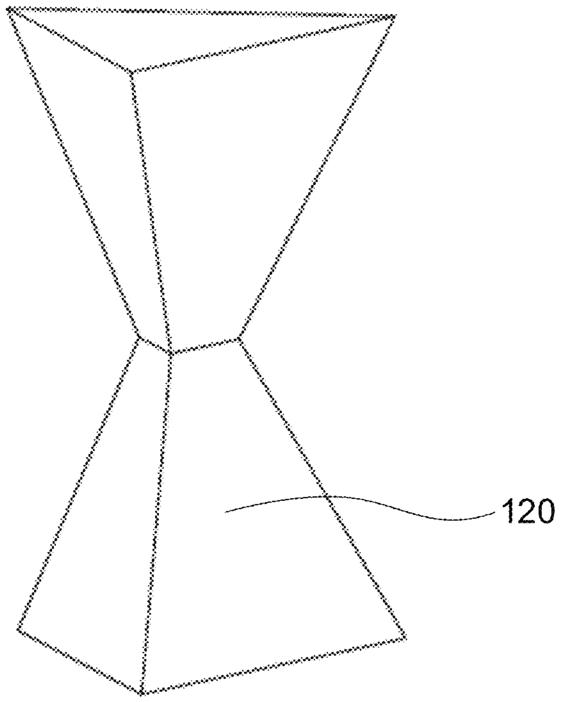
FIG. 4 is another example of a ferrite post.

The device need not be rotationally symmetric along the magnetic field axis. For example, FIG. 4 shows a bi-pyramidal ferrite post 120.

Although ferrite materials are used almost universally at the present time, it is anticipated that any non-reciprocal material performing the same function can equivalently be used in place of a ferrite.

In one possible embodiment, the ferrite is a general cylinder shape with a tapered middle section forming a narrow waist or neck in the ferrite. In one embodiment the ferrite tapered section has a quadratic profile. In another embodiment, the ferrite tapered section has a linear profile (straight lines). In another embodiment, the ferrite taper has a circular profile. In another embodiment, the profile of the taper is a series of steps rather than a continuous curve. In another embodiment the waveguide wall has a step in the height of the waveguide over a portion that includes the tapered ferrite. In another embodiment the waveguide wall has a step in the width of the waveguide over a portion that includes the tapered ferrite.

It should be understood that while a particular feature may have been disclosed above with respect to only one of several embodiments, that particular feature may be combined with one or more other features of the other embodiments as may be desired and advantageous for any given or particular application. It is, of course, not possible to describe every conceivable combination of components or methodologies for purposes of describing the innovations herein, and one skill in the art may now, in light of the above description, recognize that many further combinations and permutations are possible. Accordingly, the claimed subject matter is intended to embrace all such alterations, modifications, and variations that fall within the spirit and scope of the appended claims.

The invention claimed is:

1. A circulator device comprising:

three sections of rectangular conductively bounded hollow waveguide housing, the three sections connected to meet in a common junction; and a switching ferrite portion, disposed within a hollow space adjacent the common junction, the switching ferrite portion having a shape formed within the waveguide housing that includes an upper portion, a middle portion, and a lower portion, such that a cross sectional area of the upper portion is greater than a cross-sectional area of the middle portion, and such that a cross sectional area of the lower portion is greater than the cross-sectional area of the middle portion.

2. The device of claim 1 wherein the switching ferrite portion is interposed with at least one electrically conductive layer.

3. The device of claim 1 further wherein the shape of the switching ferrite portion is such that an operation band falls within a desired range with a broadened frequency response.

4. The device of claim 1 wherein at least one of the upper portion, middle portion or lower portion has a triangular cross-sectional shape.

5. The device of claim 1 wherein the switching ferrite portion is interposed with at least one dielectric layer.

6. The device of claim 1 wherein the switching ferrite portion further comprises a plurality of stacked ferrite material sections, each material section being generally planar.

7. The device of claim 1 wherein at least one of the upper portion, middle portion or lower portion has a circular cross-sectional shape.

8. A circulator device comprising:

three sections of rectangular conductively bounded hollow waveguide, the three sections connected to meet in a common junction;

a ferrite portion, disposed within a hollow space adjacent the common junction, the ferrite portion having a shape that includes an upper portion, a middle portion, and a lower portion, such that a cross sectional area of the upper portion is greater than a cross-sectional area of the middle portion, and such that a cross sectional area of the lower portion is greater than the cross-sectional area of the middle portion; and wherein the upper portion has a different cross sectional shape than a cross sectional shape of the lower portion.

9. A circulator device comprising:

three sections of rectangular conductively bounded hollow waveguide, the three sections connected to meet in a common junction;

a ferrite portion, disposed within a hollow space adjacent the common junction, the ferrite portion having a shape that includes an upper portion, a middle portion, and a lower portion, such that a cross sectional area of the upper portion is greater than a cross-sectional area of the middle portion, and such that a cross sectional area of the lower portion is greater than the cross-sectional area of the middle portion; and wherein the shape of the ferrite portion has a continuous taper from the upper portion through the middle portion to the lower portion.

* * * * *